(12) United States Patent
Pompier et al.

(10) Patent No.: US 6,415,839 B1
(45) Date of Patent: Jul. 9, 2002

(54) RIM INTENDED TO RECEIVE A SUPPORT RING

(75) Inventors: Jean-Pierre Pompier; Jean-Jacques Drieux, both of Volvic; Jean-Charles Lacour, Clermont-Ferrand, all of (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 09/702,959

(22) Filed: Oct. 31, 2000

(30) Foreign Application Priority Data

Nov. 4, 1999 (FR) .............................. 99 13964

(51) Int. Cl.$^7$ .................. B60B 21/02; B60C 15/02; B60C 17/04
(52) U.S. Cl. ................... 152/381.4; 152/520; 152/379.4
(58) Field of Search ................................. 152/516, 520, 152/379.3, 379.4, 379.5, 381.3, 381.4, 381.5, 381.6

(56) References Cited

U.S. PATENT DOCUMENTS

| | | | |
|---|---|---|---|
| 5,634,993 A | * | 6/1997 | Drieux et al. ............... 152/158 |
| 5,749,982 A | | 5/1998 | Muhlhoff et al. |
| 5,785,781 A | * | 7/1998 | Drieux et al. ............... 152/454 |
| 5,787,950 A | | 8/1998 | Muhlhoff et al. |
| 5,891,279 A | * | 4/1999 | Lacour ........................ 152/520 |
| 6,035,913 A | * | 3/2000 | Bapt et al. ................ 152/381.4 |

\* cited by examiner

*Primary Examiner*—S. Joseph Morano
*Assistant Examiner*—Jason R. Bellinger
(74) *Attorney, Agent, or Firm*—Baker Botts LLP

(57) ABSTRACT

A rim having a bearing support located between its two rim seats, which bearing support is intended to receive a support ring, is characterized in that this bearing surface comprises at least one surface clamping part, each surface clamping part being regularly distributed in the circumferential direction over the bearing surface and having a maximum external development Ds, measured on an enveloping surface concentric to the bearing surface, which is greater than the development Dp of the bearing surface, in order to create mechanical clamping between a support ring and the surface clamping part which is appropriate to ensure holding of the ring on the bearing surface during travel.

11 Claims, 3 Drawing Sheets

RIM INTENDED TO RECEIVE A SUPPORT RING

BACKGROUND OF THE INVENTION

The subject of the present invention is the production of a mounting rim for a tire which can form, with a tread support ring and said tire, a rolling assembly which can be used in the event of travel where the inflation pressure drops abnormally relative to the nominal use pressure, referred to as the operating pressure, the inflation pressure possibly even being canceled out.

This invention relates more particularly to the connection of a support ring to a rim onto which said ring has been slipped.

SUMMARY OF THE INVENTION

In the case of a mounting rim comprising two rim edges, two seats of respective diameters $\Phi 1$ and $\Phi 2$ and, located between the two seats, a bearing surface having an essentially cylindrical shape of minimum development Dp at least equal to the development of any rim part located axially between the axially inner end of a rim seat and the rim edge axially closest to said rim seat (see the example shown in FIG. 1), it is possible to effect the mounting of a support ring by slipping the latter around said rim seat in order to bring it, by sliding, onto the bearing surface as far as the desired position.

For this type of rim and ring assembly, there is a need to have a ring which remains integral with the rim without causing an imbalance of the unbalanced-mass type when this assembly is caused to rotate, while permitting easy mounting of the ring on its bearing surface.

Furthermore, and taking into account the irregularities in production of the rims, in particular of sheet metal rims, it is necessary to be able to achieve mounting of the support ring which is fairly lacking in sensitivity to these irregularities in order to have a ring and rim assembly which is as balanced as possible.

To this end, and in accordance with the present invention, there is proposed a rim, intended for mounting a tire comprising at least two beads, which rim is defined axially by a first rim edge and a second rim edge, comprising, viewed in meridian section, at least a first rim seat axially adjacent the first rim edge and a second rim seat axially adjacent the second rim edge, at least the first rim seat having a generatrix, the axially inner end of which is on a circle of diameter greater than the diameter of the circle on which the axially outer end is located, and at least one bearing surface intended to receive an annular bearing support, said bearing surface being arranged between the axially inner ends of the first and second rim seats; this bearing surface being of total axial width Lp and having an essentially cylindrical shape of minimum development Dp at least equal to the development of any rim part located axially between the axially inner end of the first rim seat and the first rim edge.

The rim according to the invention is characterized in that the bearing surface comprises at least one surface clamping part, each surface clamping part being regularly distributed in the circumferential direction over said bearing surface and having a maximum external development Ds, measured on an enveloping surface concentric to the bearing surface, which is strictly greater than Dp, in order to create mechanical clamping when the support ring is mounted, between said ring and said surface clamping part, which is appropriate to ensure holding of said ring on the bearing surface and, inter alia, to limit or even prevent any relative displacement in the circumferential direction between the ring and the rim.

A surface clamping part is defined as a continuous or discontinuous additional thickness over the bearing surface which is intended to create clamping forces between the support ring and said bearing surface, this additional thickness being arranged substantially along a circular line perpendicular to the axis of rotation of the rim.

"Regularly distributed in the circumferential direction over the bearing surface of the rim" is understood to mean a surface clamping part which forms a relief protrusion on said bearing surface and which is:

either continuous in the circumferential direction around the bearing surface;

or composed of a plurality of elements in relief, the circumferential distances between each of said elements being substantially equal; these elements in relief are arranged along a circular line concentric to the bearing surface.

"Enveloping surface" is understood to mean the cylindrical surface of lesser development which envelops a surface clamping part. When this enveloping surface has as its axis of symmetry the axis of rotation of the rim, this means that the enveloped surface clamping part has the same radial offset relative to the bearing surface of development Dp.

"Development" is understood to mean the circumferential length or extent of an actual or virtual cylindrical surface.

When use is made of a support ring, the minimum development of the internal surface of which is substantially equal to the development Dp of the bearing surface, a degree of clamping, referred to as Ts, can be defined on each surface clamping part which is equal to the ratio (Ds-Dp)/Dp. Judiciously, the value of the development Ds of each surface clamping part is selected such that this degree of clamping Ts enables the support ring to be put in place on the rim while maintaining sufficient clamping to prevent sliding of the ring relative to the rim when the rim and support ring assembly is driven in rotation.

For a given degree of clamping between a support ring and a surface clamping part, it is preferable for the axial width Ls of said part to be between 10% and 50% of the axial width Lp of the bearing surface in order to limit the effort to be provided for putting the ring in place on this surface clamping part. When the axial width Ls of a surface clamping part is less than 10% of the axial width Lp of the bearing surface, the clamping forces are not sufficient to ensure good holding of the support ring on the rim; when the axial width Ls of a surface clamping part is greater than 70% of the axial width Lp of the bearing surface, the efforts to be provided for effecting mounting of the ring become excessive and may either prevent mounting or induce within the support ring excessive stresses which are harmful to good fatigue strength over time.

Provision may be made to provide on the bearing surface of a rim a plurality of surface clamping parts which are distributed in the axial direction over the bearing surface, each surface clamping part having a specific development and width which may be identical or alternatively different. Preferably, and for a degree of clamping selected for each surface clamping part, the total of the widths of said surface clamping parts will be between 15% and 70% of the width Lp of the bearing surface. These values are intended to ensure easy mounting and satisfactory clamping of a support ring on the rim.

With the aim of facilitating the putting in place of the support ring on the rim, each surface clamping part may be connected to the bearing surface, on the side of the rim seat from which the support ring is slipped on, by means of a surface generated by a generatrix which is connected at a first point to the surface clamping part and at a second point of the bearing surface, the straight line passing through said two points forming an angle other than 90° with the axis of rotation of the rim. This same characteristic may be provided on both sides of each surface clamping part in order also to facilitate the demounting of the support ring.

Another variant embodiment consists in forming on a rim and on the part thereof axially farthest from the rim seat onto which the support is slipped, a surface clamping part of frustoconical shape which merges with the axis of rotation, and the generatrix of which forms with the axial direction an average angle of between 1° and 5°, the minimum development of said surface part being on the side of the rim seat onto which the support is slipped.

DESCRIPTION OF DRAWINGS

The present invention will be better understood with reference to the drawings attached to the description, which illustrates non-limitative examples of embodiments of a rim which is intended for mounting a tire, in which drawings.

DESCRIPTION OF PREFERRED EMBODIMENTS

Figure 1:
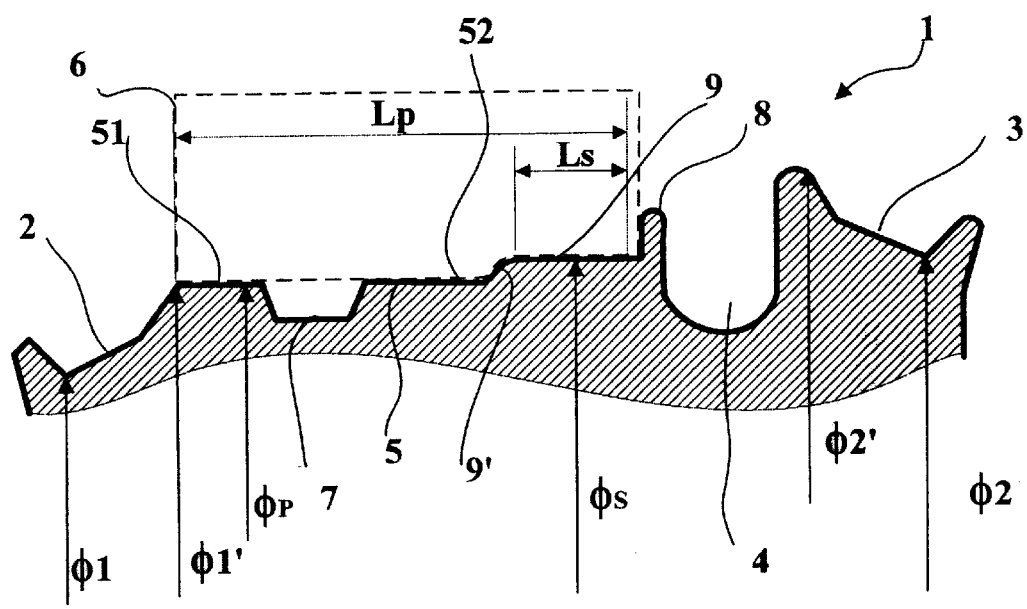
FIG. 1 shows in section an integral rim according to the invention provided with a surface clamping part formed of four elements in relief on the bearing surface which are regularly distributed in the circumferential direction.

The rim 1 shown in FIG. 1 is formed mainly of two rim seats 2 and 3, a mounting groove 4 and a bearing surface 5 intended to receive a support ring 6 (shown in broken lines). The two rim seats 2 and 3 have axially outer ends located on circles, the diameters $\Phi 1$ and $\Phi 2$ of which are respectively less than the diameters $\Phi 1'$ and $\Phi D2'$ of the circles on which the axially inner ends of said seats are located. Furthermore, the diameters $\Phi 1$ and $\Phi 1'$ of the first rim seat 2 are, respectively, less than the diameters $\Phi 2$ and $\Phi 2'$ of the second rim seat 3.

The bearing surface 5 of width Lp axially extends the radially outermost end of the first rim seat 2 and is formed of two cylindrical zones 51 and 52, of the same development Dp (corresponding to a diameter $\Phi p$), said zones being separated axially by a groove 7 which is intended to lighten the rim and for putting in place a device for warning of a loss of pressure during travel.

The end of the bearing surface 5 axially farthest from the first rim seat 2 is provided with a circumferentially continuous rib 8 intended to act as a stop for the lateral displacement of the support ring.

Figure 2:
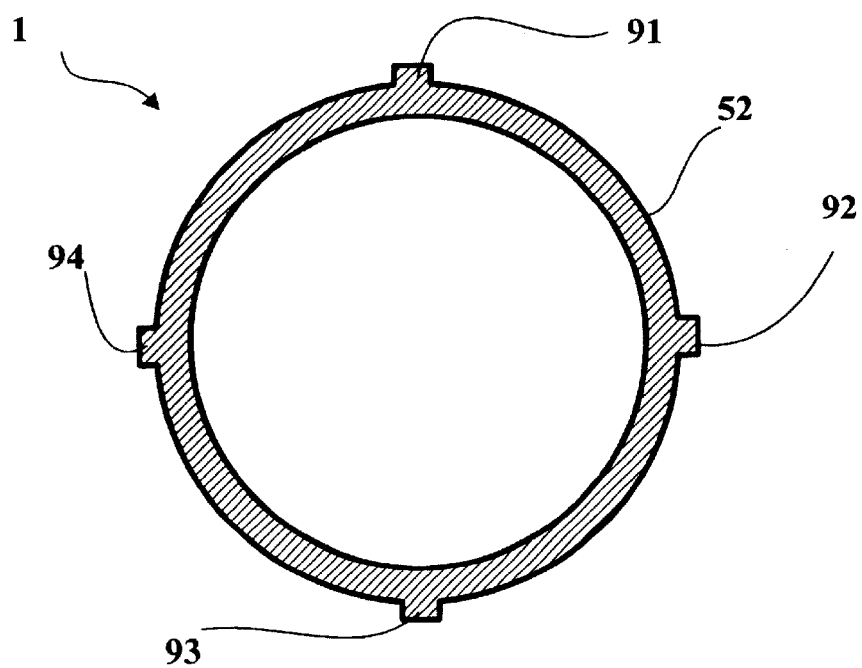
FIG. 2 shows a partial section through the rim shown in FIG. 1, this section being taken in a plane perpendicular to the axis of rotation of the rim passing through the surface clamping part.

In the vicinity of this stop 8, the bearing surface 5 comprises a surface clamping part 9 formed of four elements in relief on said bearing surface 5. These elements in relief 91, 92, 93 and 94, shown in FIG. 2, which shows the same rim viewed in a transverse section plane perpendicular to the axis of rotation, are arranged at the same circumferential distance from each other. Each element in relief has a surface radially to the outside which is cylindrical, and the width Ls of which, measured in the axial direction, is less than the width Lp of the bearing surface.

The surface clamping part 9 formed by the four elements in relief may be enveloped by a virtual enveloping surface which, in the present case, is cylindrical and concentric to the bearing surface and has a development Ds (corresponding to the diameter $\Phi S$ shown in FIG. 1) which is greater than the development Dp of the bearing surface 5.

In order to facilitate the putting in place of a ring on the bearing surface 5 and on the elements in relief forming the surface clamping part 9, the radially outer surface of each element in relief is extended toward the bearing surface, on the side of the first rim seat 2 onto which the support ring is slipped, by a surface 9' generated by a generatrix having the shape of an arc of a circle which is connected, on one side, tangentially to the radially outer surface of each element in relief and, on the other side, perpendicular to the bearing surface.

In the example set forth, it will be noted that the presence of a plurality of elements in relief distributed regularly in the circumferential direction will cause a support ring to be shaped substantially into a polygon by flexural deformation of said ring. Furthermore, it was surprisingly noted that this shaping into a polygon was beneficial for maintaining or even establishing the clamping of a support ring comprising a virtually inextensible reinforcement armature in the circumferential direction on its rim. When the support ring and rim assembly is caused to rotate, everything happens as if this reinforcement armature of the ring had a tendency to try to adopt a circular geometry of development less than the development Ds of the surface enveloping the surface clamping part formed of a plurality of elements in relief, which, given the characteristics of inextensibility of said armature, results in an increase in the clamping forces of the support ring on the elements in relief, at least until a speed threshold beyond which the armature is deformed sufficiently to achieve a development greater than Ds. The same effect is furthermore obtained whether or not there is clamping once the support ring has been mounted on the rim provided with elements in relief and whether or not the elements in relief are distributed regularly in the circumferential direction. The effect noted exists once the internal development of the support ring is less than the development of the cylindrical surface enveloping one of the surface clamping parts composed of a plurality of elements in relief; in this case, it is not necessary for a clamping pressure to be established between a support ring and said elements at the time of mounting for the clamping of the ring on the rim to appear once the rim/ring assembly has been caused to rotate.

It is useful to alert the user to an insufficient inflation pressure within a tire mounted on a rim provided with a support ring. The presence of surface clamping parts formed of circumferentially discontinuous elements in relief can make it possible to satisfy this requirement. To this end, a rim is provided with a first surface clamping part and a second surface clamping part which are separated from each other in the axial direction, these surface clamping parts being composed of an equal number of elements in relief distributed regularly in the circumferential direction, the elements in relief of said first part being offset relative to the elements in relief of said second part in the circumferential direction. Thus, when the pressure has dropped far enough to reach a predetermined threshold, the rim travels bearing on the support ring mainly by means of its elements in relief, which gives rise, apart from traveling noise due to passing from one element to the next, to a sort of oscillation of the rim about an axis corresponding substantially to the direction of displacement of the tire/rim assembly, said rim bearing alternatively on the first surface clamping part then on the second, passing from one element in relief to another. This movement, which can be compared to a cambering movement, may either be felt directly by the driver of the vehicle fitted with such a tire assembly, or detected by an appropriate device.

It should be specified that in the example described an inflation valve may be provided to open into the groove 7: the circumferential discontinuity of the surface clamping part making it possible easily to inflate a tire mounted on the rim which is fitted with a support ring.

In an example of embodiment of a 205-440 rim intended to be fitted with a tire of dimension 205-650-440 PAX for a passenger vehicle, the characteristic dimensions were as follows:

Lp=135 mm; Ls=30 mm (Ls/Lp=22%)
$\Phi$p=446 mm; $\Phi$s=447 mm; $\Phi$1=440 mm.

Figure 3:
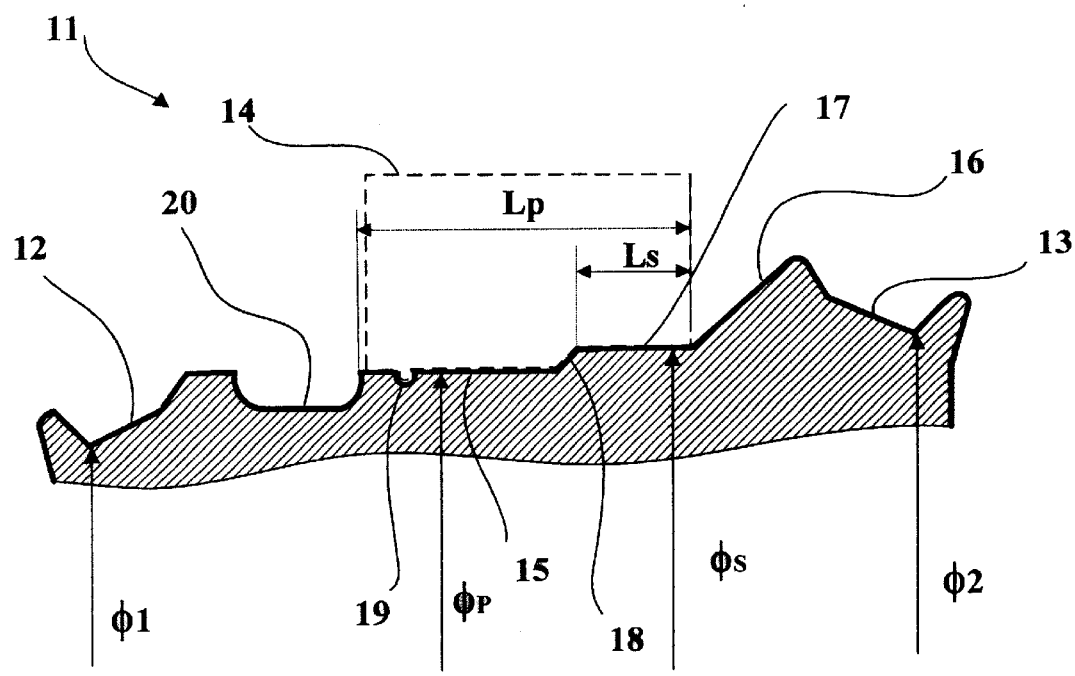
FIG. 3 shows a cross-section through an integral rim comprising a lateral locking groove for a support ring provided with a circumferentially continuous surface clamping part.

FIG. 3 shows a rim 11 which is fairly similar to the rim 1 shown in FIG. 1, except for the difference that it no longer comprises a mounting groove (marked 4 in FIG. 1), but only a groove 20 for lightening said rim and provided for example for positioning an under-inflation warning device. The rim seat 13 of diameter $\Phi$2 greater than the diameter $\Phi$1 of the rim seat 12 is extended axially towards the bearing surface 15 by a frustoconical surface 16. The bearing surface 15 of general cylindrical shape, of average diameter $\Phi$p, is provided with a cylindrical surface clamping part 17 of diameter $\Phi$s and of axial width Ls which is connected on one side to the frustoconical surface 16. To facilitate the mounting of a support ring 14 (shown in broken lines) on the bearing surface 15, the radially outer surface of the surface clamping part 17 is extended by a frustoconical surface 18 which is connected to said bearing surface on the side of the rim seat 12 of smaller diameter. In this example, the bearing surface 15 comprises a groove 19 intended to receive a rib in relief on the inner surface of the support ring 14 in order to prevent any axial displacement of said ring during travel.

Figure 4:
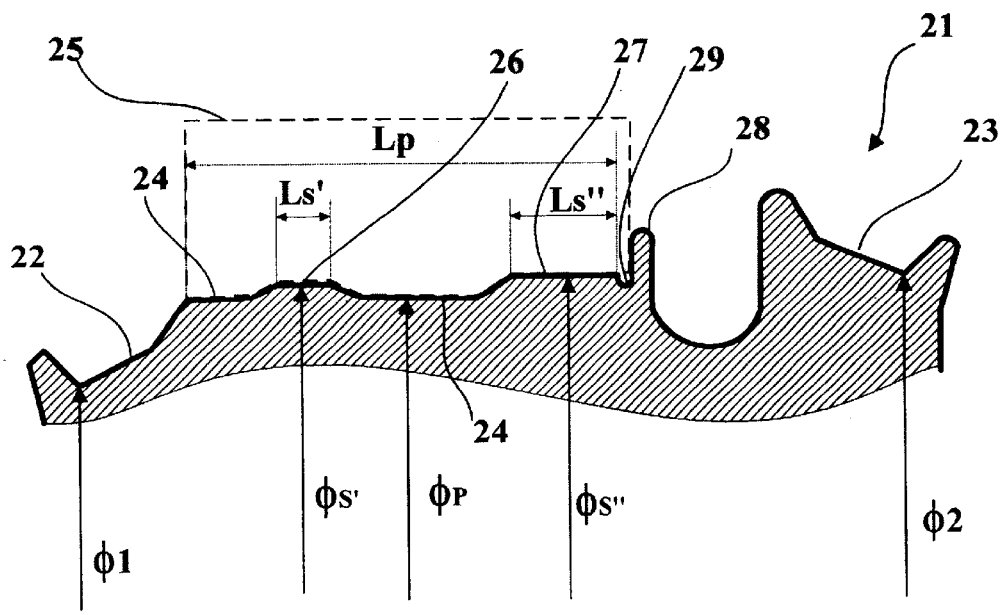
FIG. 4 shows a variant embodiment in which the bearing surface of a rim comprises two surface clamping parts of different developments and axial widths.

FIG. 4 shows a variant of a rim 21 according to the invention which is close in its general form to the rim 1 shown in FIG. 1. The rim 21 comprises axially between its two rim seats 22, 23 a bearing surface 24 which axially extends the rim seat 22 of smaller diameter which is intended to be introduced first into a support ring 25 in order to mount said ring (shown in broken lines) on said rim. This bearing surface 24 is provided with a first and a second surface clamping part 26, 27 which are circumferentially continuous and are separated axially from each other. The second surface clamping part 27 is located in the vicinity of a stop 28 limiting the axial displacement of the ring 25 in position on the rim 21, whereas the first surface clamping part 26 is substantially located halfway between the second surface clamping part 27 and the first rim seat 22. In the example shown, the surface clamping parts 26, 27 have cylindrical outer shapes of diameters $\Phi$s' and $\Phi$s" of axes which are merged with the axis of rotation of the rim and are of different widths Ls' and Ls".

The diameters $\Phi$s", $\Phi$s', $\Phi$p satisfy the following relationship: $\Phi$s">$\Phi$s'>$\Phi$p ($\Phi$s" is greater than $\Phi$s', which in turn is greater than $\Phi$p) and the width Ls" of the second surface clamping part 27 is greater than the width Ls' of the first surface clamping part 26 so as to reduce the effort necessary for putting in place the support ring 25, the internal development of which is, for example, substantially equal to the development of the bearing surface 24.

It should be noted that a groove 29 of small width is provided between the second surface clamping part 27 and the stop 28 to avoid having a zone of connection between said surface clamping part and the stop which would reduce the height of the lateral wall of the stop perpendicular to the axis of rotation; this arrangement permits satisfactory axial holding of the support ring once the latter has been put in place against said lateral wall of the stop.

Of course, in the example which has just been described it is possible to replace at least one of the circumferentially continuous surface clamping parts with a discontinuous surface clamping part.

Figure 5:
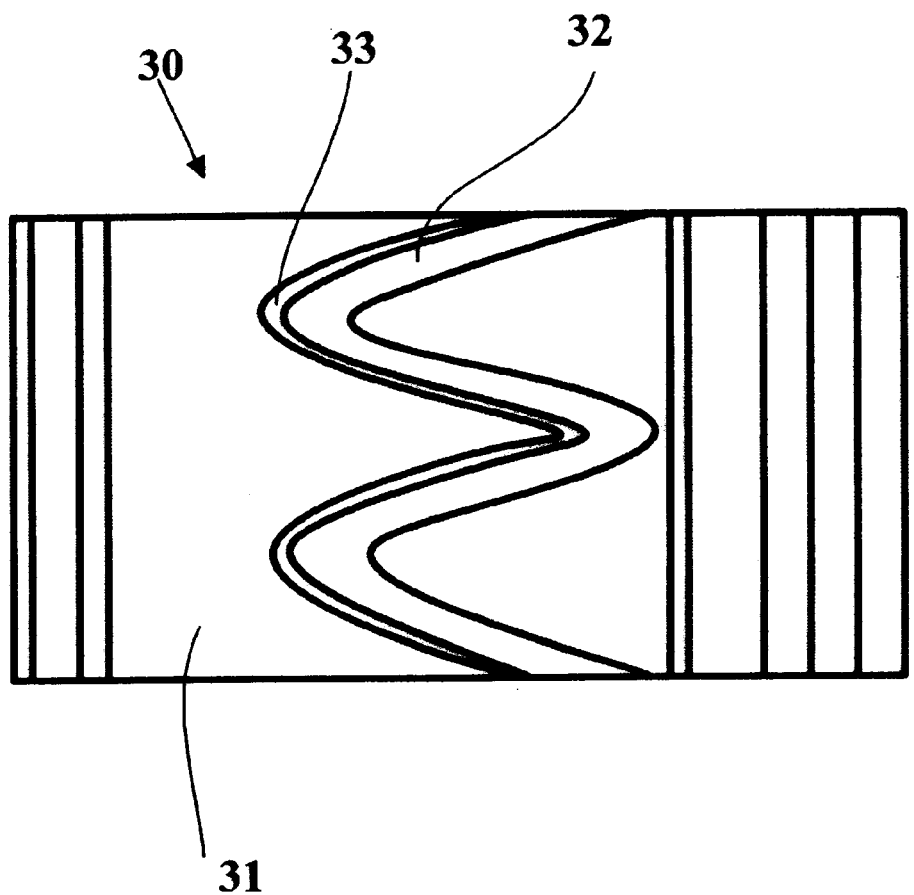
FIG. 5 shows the outer surface of the bearing surface of a rim according to the invention comprising a surface clamping part which is circumferentially continuous and has an undulating average geometry.

The last example shown in FIG. 5 (showing a "flattened" view of the radially outer surface of a rim 30) illustrates a specific case in which this rim comprises a bearing surface 31 provided with a circumferentially continuous surface clamping part 32, the average profile of which on said bearing surface has a zigzag or undulating geometric shape or trace. To facilitate putting a ring in place on said surface clamping part, there is provided a connecting surface 33 which forms an angle other than 90° with the axial direction.

Another embodiment, not shown, consists in producing a plurality of relief ribs on the bearing surface, the width of said ribs being substantially equal to the average circumferential distance between two consecutive ribs. These ribs may have a direction which substantially merges with or alternatively inclined relative to the axial direction of the rim.

We claim:

1. A rim for mounting a tire having at least two beads, which rim is defined axially on one side by a first rim edge and on the opposite side by a second rim edge, comprising, viewed in meridian section, a first rim seat axially adjacent said first rim edge and a second rim seat axially adjacent said second rim edge, at least the first rim seat having a generatrix, the axially inner end of which is on a circle of diameter greater than the diameter of a circle on which the axially outer end is located, and at least one bearing surface, of axial width Lp, intended to receive an annular bearing support by sliding said support over at least said one side of the rim, said bearing surface being arranged between the axially inner ends of the two seats and having an essentially cylindrical shape of minimum development Dp at least equal to the development of any rim part located axially between the axially inner end of the first rim seat and the first rim edge, wherein:

the bearing surface comprises at least one surface clamping part, each surface clamping part being regularly distributed in the circumferential direction over said bearing surface and having a maximum external development Ds greater than Dp, said development Ds being measured on an enveloping surface concentric to the bearing surface, in order to create mechanical clamping when a tire support ring is mounted between said ring and said surface clamping part, which mechanical clamping is appropriate to ensure holding of said ring on the bearing surface.

2. A rim as set forth in claim 1 wherein each surface clamping part has an axial width Ls which is between 10% and 50% of the axial width Lp of the bearing surface.

3. A rim as set forth in claim 2 wherein each surface clamping part is connected to the bearing surface on the side of the rim seat from which the support ring is slipped on, by means of a surface generated by a generatrix which is connected at a first point to the surface clamping part and at a second point to the bearing surface, the straight line passing through said two points forming an angle other than 90° with the axis of rotation of the rim to facilitate the installation of the support ring.

4. A rim as set forth in claim 1 wherein at least one surface clamping part is circumferentially continuous and is inscribed on a cylindrical enveloping surface of development Ds, said enveloping surface being concentric to the bearing surface.

5. A rim as set forth in claim 4 wherein at least one surface clamping part has, in the axial direction, a zigzag or undulating average trace.

6. A rim as set forth in claim 1 wherein the bearing surface comprises two surface clamping parts which are axially distinct from one another, one of said parts being of a lesser axial width Ls' than the axial width Ls" of the other of said parts, the part of lesser axial width being located between the other part and the side of the rim onto which the support is slipped.

7. A rim as set forth in claim 1 wherein at least one surface clamping part is composed of elements in relief which are regularly distributed in the circumferential direction over the bearing surface, each element in relief having an axial width Ls which is at least equal to 10% of Lp, the development Ds of the cylindrical surface enveloping all said elements in relief of one and the same surface clamping part being greater than Dp.

8. A rim as set forth in claim 7 wherein said rim is provided with at least two surface clamping parts separated from each other in the axial direction, at least a first surface clamping part and a second surface clamping part being composed of an equal number of elements in relief distributed regularly in the circumferential direction, the elements in relief of said first part being offset relative to the elements in relief of said second part in the circumferential direction.

9. A rim as set forth in claim 1 wherein the surface clamping part is frustoconical and forms with the axial direction an average angle of between 1° and 5°, the minimum development of said surface part being on the side of the rim seat onto which the support ring is slipped.

10. A rim as set forth in claim 1 wherein the bearing surface furthermore comprises a stop to limit axially the positioning movement of the support ring and in that a surface clamping part is arranged close to said stop.

11. A rim as set forth in claim 10 wherein the surface clamping part close to the stop is separated from said stop by a groove.

* * * * *

UNITED STATES PATENT AND TRADEMARK OFFICE
CERTIFICATE OF CORRECTION

PATENT NO.   : 6,415,839 B1
DATED        : July 9, 2002
INVENTOR(S)  : Pompier et al.

It is certified that error appears in the above-identified patent and that said Letters Patent is hereby corrected as shown below:

Column 3,
Line 53, "$\Phi D2'$" should read -- $\Phi 2'$ --

Signed and Sealed this

Eleventh Day of February, 2003

JAMES E. ROGAN
*Director of the United States Patent and Trademark Office*